April 12, 1960     T. J. PROVENZA     2,932,297
ELECTRICAL ARTIFICIAL EJACULATOR
Filed Nov. 10, 1954     2 Sheets-Sheet 1
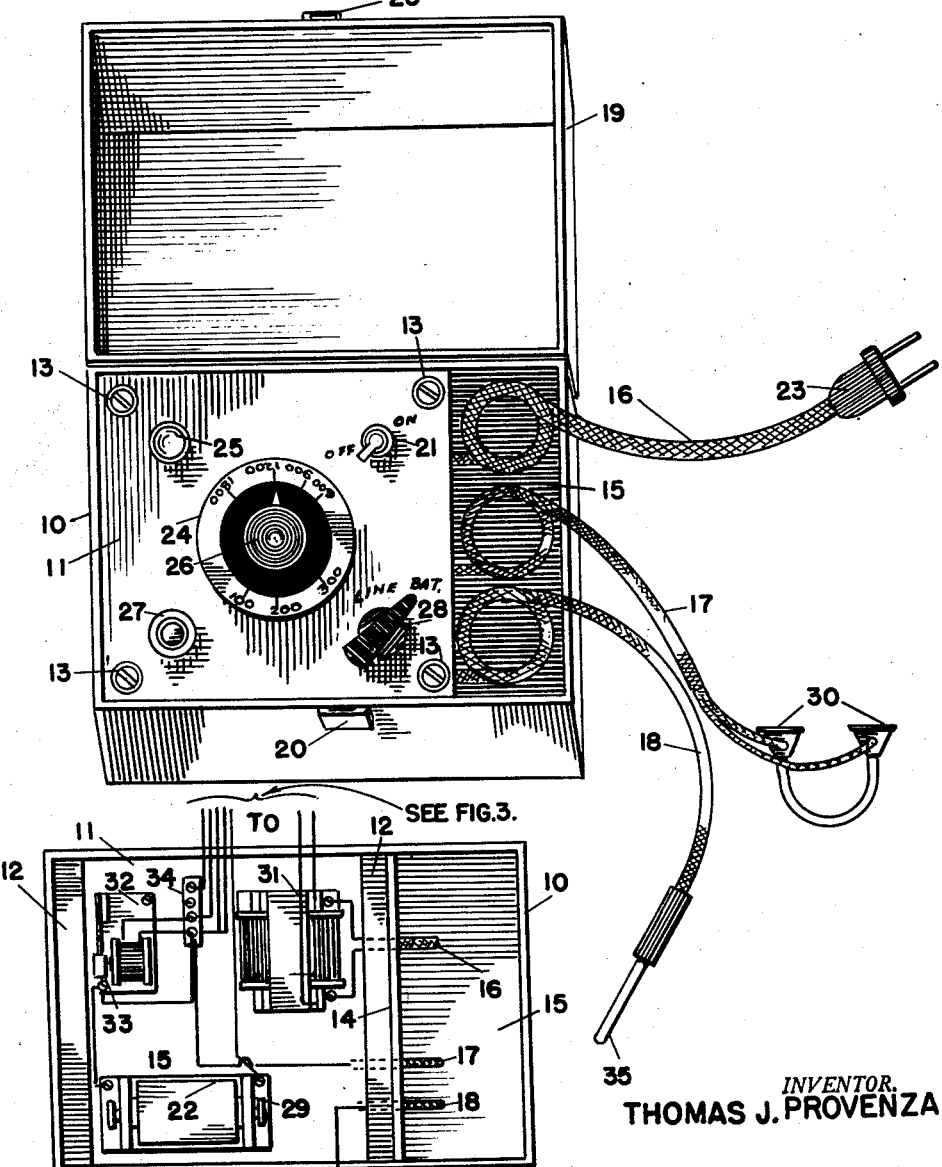
INVENTOR.
THOMAS J. PROVENZA.
BY Howard J. Whelan
ATTORNEY.

April 12, 1960  T. J. PROVENZA  2,932,297
ELECTRICAL ARTIFICIAL EJACULATOR
Filed Nov. 10, 1954  2 Sheets-Sheet 2

*INVENTOR.*
THOMAS J. PROVENZA
BY Howard J. Whelan
ATTORNEY

United States Patent Office 2,932,297
Patented Apr. 12, 1960

2,932,297
ELECTRICAL ARTIFICIAL EJACULATOR
Thomas J. Provenza, Baltimore, Md.
Application November 10, 1954, Serial No. 467,974
1 Claim. (Cl. 128—419)

This invention relates to medical equipment and more particularly to a device for the mechanical and artificial ejaculation of semen or seed from the male organs of beings in the animal kingdom, for reproductive purposes.

Breeders of animals sometimes have trouble with their charges because of the lack of sufficient interest of the latter in the matter of sexual conduct, especially on the part of males. This happens among animals of the rodent class and is a source of anxiety on the part of the breeders seeking to increase their flocks or groups. To overcome this and to get more definite results, this invention of an electrical nature has been developed. The invention primarily consists of an electrode applicable into the rectum of a male animal and forming one side of a circuit while the other electrode to complete this circuit is made to contact the areas closest to the testicles. Then to provide adequate excitement and spasmodic muscular reactions, voltage varying from 100 volts to 1800 volts (depending on the class of animal involved) is intermittently applied. This application is continued until the semen is emitted or ejaculated and collected in a suitable container. The semen is then injected as required into a female of the same species when she is in heat to make her conceive.

The object of the invention is to provide a new and improved ejaculator that will avoid one or more of the disadvantages and limitations of the prior art.

Another object of the invention is to provide a new and improved ejaculator for use on male animals of selected species, that is simple in construction and operation, safe and convenient to use.

A further object of the invention is to provide a new and improved ejaculator that will have portability, and facile adjustability in the use of electrical energy to meet the requirements for small or large animals.

An additional object of this invention is to provide a new and improved ejaculator that will act positively and quickly on an animal selected, and without causing undue pain or inconvenience.

A still further object of the invention is to provide a new and improved means of an electrical nature for inducing a prompt discharge of semen or seed without coition on the part of a suitable animal, without involving medicants, medical treatment or medicines, or other items and processes of an undesirable nature.

Other objects will become apparent as the invention is more fully outlined.

For a clearer understanding and depiction of the invention, reference is made to the accompanying drawings wherein a particular form of the invention is shown. These drawings in conjunction with the following description explain its preferred form and construction, indicate its principles and describe its operation, while the claim included shows the scope of the invention.

Referring to the drawings:

Figure 1 is a view in perspective of an ejaculator embodying this invention with its cover open to show a part of its inner construction;

Figure 2 is a plan view of the ejaculator with its upper shelf removed to show the inner construction, with parts of the outside electrical conductors removed;

Similar reference numbers refer to similar characters throughout the drawings.

Figure 3:
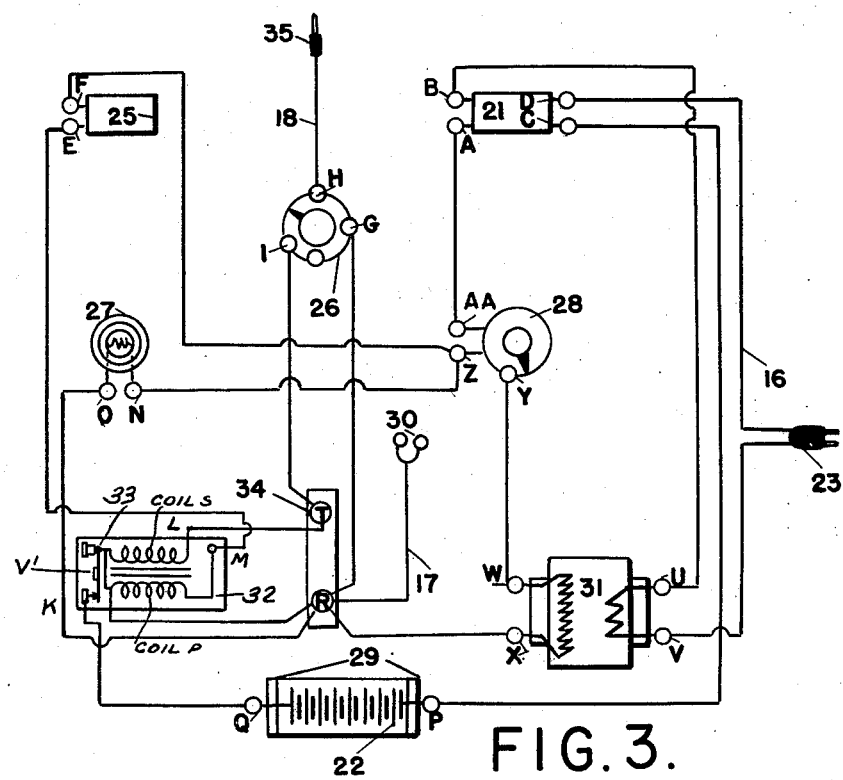
Figure 3 is a diagram of the controls, components and circuits of this embodiment.
Figure 4:
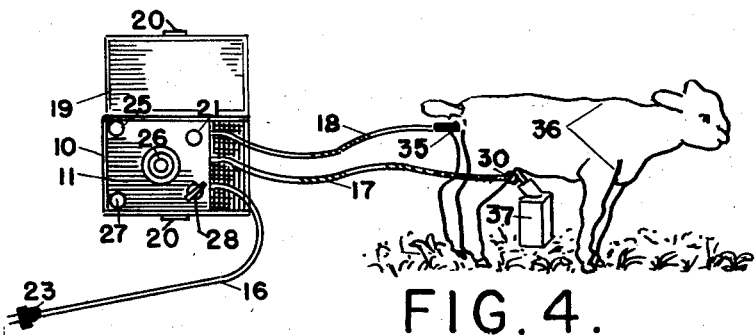
Figure 4 is a picture showing the manner in which the invention is applied to an animal.

The ejaculator consists of a cabinet 10, which is cubical in form, and provided with a shelf 11 with the various controls mounted on it. The shelf is supported horizontally in the cabinet near its upper edge, on ledges 12. Screws 13 fasten the shelf to the ledges. A partition wall 14 through which the electrical cables pass from the binding posts to which they are connected, is located against the shelf and runs vertically to the bottom 15 of the cabinet. This partition 14 leaves a space or well between it and the outer wall structure of the cabinet, in which the electrical cords or cables 16, 17 and 18 are stored when not pulled out of the cabinet for use in making the ejaculation. The shelf 11, partition 14 and three walls of the cabinet and the cabinet bottom form a closed chamber in which the working components of the device are installed. A lid 19 is hinged to the top edge of the cabinet for covering it, and is provided with a suitable catch 20 to hold it closed.

The cable 16 is arranged to form an electrical circuit from the plug 23 through the primary coil of transformer 31, by way of contacts U and V, when switch 21 connects to contacts B and D. The contact W of the secondary coil of the transformer 31 is connected to contact Y. A switch 28 may be rotated to connect contact Y with contact Z.

Contact Z is connected to contact F of the push button switch 25, and is also connected to the terminal N of the branch circuit through lamp 27. The other contact E of the push button switch is connected to the contact M of a primary coil P which terminates at a contact R. Contact R is a tie point contact of a wiring junction board 34. Contact R is then connected to the contact X of the secondary coil of transformer 31. The circuit through lamp 27 is also connected to contact R.

When switch 28 is turned to connect contacts AA and Z and switch 21 is swung to connect contact A and C, direct current flows from the battery intermittently through the vibrator V¹, generally designated 32 and provided with spring vibrator 33, and through primary coil P, provides the push button switch 25 is closed. Current also flows through the branch circuit including lamp 27.

The ejaculator includes a conductor jack 35, intended to be inserted in the rectum of the animal to be treated and it also includes an applicator 30 to be attached to the testicles of the animal. It also includes a coil S associated with coil P and adapted to be energized by alternating or pulsating current through the latter to produce pulsating current having voltages of 100, 200, 300, 600, 900, 1200, 1500 and 1800 volts at the option of the operator. Coil S is connected via an intermediate tie point contact T of the junction board 34 to a potentiometer 26, to which the conductor 18 is applied to take off current of the desired voltage. The applicator 30 is connected to one end of coil S by conductor 17.

The operation of the device now will be explained. The jack 35 and applicator 30 are applied to the animal to be treated. If alternating current is available, jack 23 is attached to a source of supply thereof. Switch 21 is swung to connect contacts B and D, switch 28 is operated to connect contacts Y and Z, and push button switch 25 is depressed to connect contacts E and F. Alternating current at 6 volts flows from the secondary of transformer 31, through the circuit including coil P and also through lamp 27. An induced current at the desired voltage flows through a circuit including coil S, potentiometer 26, jack 35, the animal being treated and the applicator 30 back to coil S.

When it is desired or necessary to use battery 22, switch 21 is swung to connect contacts A and C, switch 28 is operated to connect contacts AA and Z, and push button switch 25 is moved to connect contacts E and F. Pulsating current now flows through coil P under the influence of the vibrator $V^1$ and through the circuit including elements E, F, Z, AA, A, 21, C and the battery. Current also flows through the branch circuit including the lamp.

The device is termed an ejaculator to specifically indicate its purpose, and no other term has been adopted previously. This invention has several valuable features from a practice point of view. The device can be made portable by reason of the simplicity of its construction and the components it includes. These components are relatively few in number and of standard construction that is compact and light. It can be used in a barn or building employing electrical outlets to which this unit may be attached; or it may use the batteries already installed in the cabinet to make the device portable in its use. In the latter instance, the device may be used in the field away from any source of outside electrical service. The device is under the control of the operator at all times. All details such as voltage regulation, current indicators, and adjustability for the needs of various animals are within the field of observance of the operator. It involves no complications that would add to the cost of manufacture or maintenance. Also it operates quietly; is harmless to the animal; and requires little skill on the part of the user or users for its proper operation.

While but one form of the invention is illustrated in these specifications and drawings, it is not desired to limit the application to just this form, as it is appreciated that others could be designed and made that would employ the same principles and come within the scope of the appended claim.

Having thus described the invention, what is claimed is:

An ejaculator for obtaining semen from a male animal, said ejaculator comprising a first jack for insertion in the rectum of said animal and an applicator for application to the testicles of said animal, structure including a potentiometer and a coil connected to said potentiometer, a conductor connected to said first jack to be applied to said potentiometer to obtain current therefrom for passage through said animal, a conductor to connect said applicator to one side of said coil to return the current flow from said animal, a primary coil adapted to have a current at low voltage passed therethrough and associated with the first mentioned coil to energize the same, means for supplying current to said primary coil from a source of alternating current, including a second jack, a switch including a pair of contacts and the primary winding of a transformer; said transformer including a secondary winding connected to a switch contact, a push button switch, a contact adjacent said switch contact and a rotatable element to connect said contacts to form a circuit through said push button switch when the latter is closed and through to said first mentioned low voltage primary coil back to the secondary winding of said transformer, a battery for energizing the said primary winding through a circuit including a pair of contacts positioned to be connected through the first mentioned switch, a contact positioned to be connected to the second mentioned contact by said rotatable element, the push buton switch and a vibrator connected to said battery, said switch having the rotatable element being adapted to selectively complete an alternating current or a direct current through the first mentioned primary coil.

References Cited in the file of this patent

UNITED STATES PATENTS

| 943,918 | Davenport | Dec. 21, 1909 |
| 1,532,463 | Winterfield | Apr. 7, 1925 |
| 2,710,610 | Woodruff | June 14, 1955 |

FOREIGN PATENTS

| 993,901 | France | Aug. 3, 1951 |

OTHER REFERENCES

1936 Council for Scientific & Industrial Research Bulletin, No. 94 of Australia, 6 pages. (Copy in Div. 55.)